June 30, 1970

E. E. HORTON 3,517,518

APPARATUS AND METHOD FOR TERMINATING A SUBSEA PIPELINE AT A SEA SURFACE STATION

Filed June 26, 1968

INVENTOR.
EDWARD E. HORTON
By
Miketta, Glenny, Poms & Smith
ATTORNEYS.

INVENTOR.
EDWARD E. HORTON
By
Miketta, Glenny, Poms & Smith
ATTORNEYS.

United States Patent Office 3,517,518
Patented June 30, 1970

3,517,518
APPARATUS AND METHOD FOR TERMINATING A SUBSEA PIPELINE AT A SEA SURFACE STATION
Edward E. Horton, Portuguese Bend, Calif., assignor to Deep Oil Technology, Inc., Long Beach, Calif., a corporation of California
Filed June 26, 1968, Ser. No. 740,230
Int. Cl. F16l 1/00
U.S. Cl. 61—72.3                    15 Claims

ABSTRACT OF THE DISCLOSURE

An apparatus and method for terminating a subsea-pipeline at an oil collection and distribution surface station without making any subsurface terminal pipe connections and without subjecting the pipeline to undue stress. The disclosed method includes the laying of a continuous pipeline from a surface vessel with respect to a ramp having a curved shape for supporting the pipeline, cutting the pipeline at the vessel and moving the free end to the station where it is supported by another portion of the ramp, and supporting and securing the pipeline to the station. The apparatus includes the surface platform of the station and the ramp which has a first portion with an ogee curve for supporting the pipeline from the ocean bottom to a subsurface water depth, a second ramp portion between the first ramp portion and the station platform, and apparatus for transferring the pipeline laid on the first ramp portion to the second ramp portion for making a terminal connection above the sea surface.

In producing oil underlying offshore waters, it is well known to use submerged wellhead equipment connected to a subsea pipeline which is laid along the ocean bottom. The pipeline or flowline is run along the ocean floor to a location nearby a surface station. Such surface station may serve either for oil collection in submerged tanks and/or as a distribution station for the oil by supplying the oil to, for example, an oil tanker.

In prior proposed methods, a pipeline laid along the ocean bottom is brought into proximity of a surface station. An underwater connector or J-tube is then connected to the submerged pipeline at the ocean floor and a vertical pipeline is then run to the surface platform. Since many lines from a number of wells may terminate at a given surface station, numerous underwater connectors are required and these devices are extremely expensive. Moreover, such underwater connection is not easily made, requiring a diver to perform prolonged and complicated underwater manipulation to effect the connection. Furthermore, the pipeline which is laid, despite the use of extreme care, cannot be precisely cut to the length required for connection to the underwater connector, requiring measuring the distance between a J-tube end and the pipe end, cutting a pipe to such length, and making two underwater connections, all of which require further extensive work by an underwater diver. In the event that a pipeline which is laying upon the sea floor is raised at its free end and connected to the surface platform, it has been found that excessive bending stresses may be produced in the pipeline near the station and structural failure thereof may occur.

Accordingly, it is one object of the present invention to provide a method and apparatus for terminating a subsea pipeline at a surface station without making a difficult submerged pipe connection and without subjecting the pipeline to undue stress thereby avoiding the disadvantage of prior arts methods and apparatus.

It is another object of the present invention to provide a method of terminating a subsea pipeline at a surface station from which oil may be collected and distributed without making any subsurface terminal pipe connections, thereby minimizing underwater operations at the surface station.

Yet another object of the present invention is to provide an apparatus for terminating a subsea pipeline at a surface station without making any underwater terminal pipe connections and employing a station structure which will facilitate and expedite the connection of the terminal portion of the pipeline to an above-surface connector on the platform while minimizing stress within the pipeline thereby preventing structural failure thereof.

Generally stated, the present invention provides a method and apparatus for terminating a subsea pipeline at a sea surface station without making subsurface terminal connections and without creating destructive structural stresses in the pipeline by laying the continuous pipeline along the ocean bottom from a surface vessel which is moved over and beyond a submerged ramp having a portion with an ogee curve for temporarily supporting the pipeline and a second portion for permanently supporting the pipeline, cutting the pipeline from the vessel beyond the ramp, moving the free end to a platform where it is supported by the ramp first and second portions in the same direction, and supporting and securing the pipeline on the ramp.

Other objects and advantages of this invention will be more readily appreciated from consideration of the following detailed description when considered in connection with the accompanying drawings.

Figure 1:
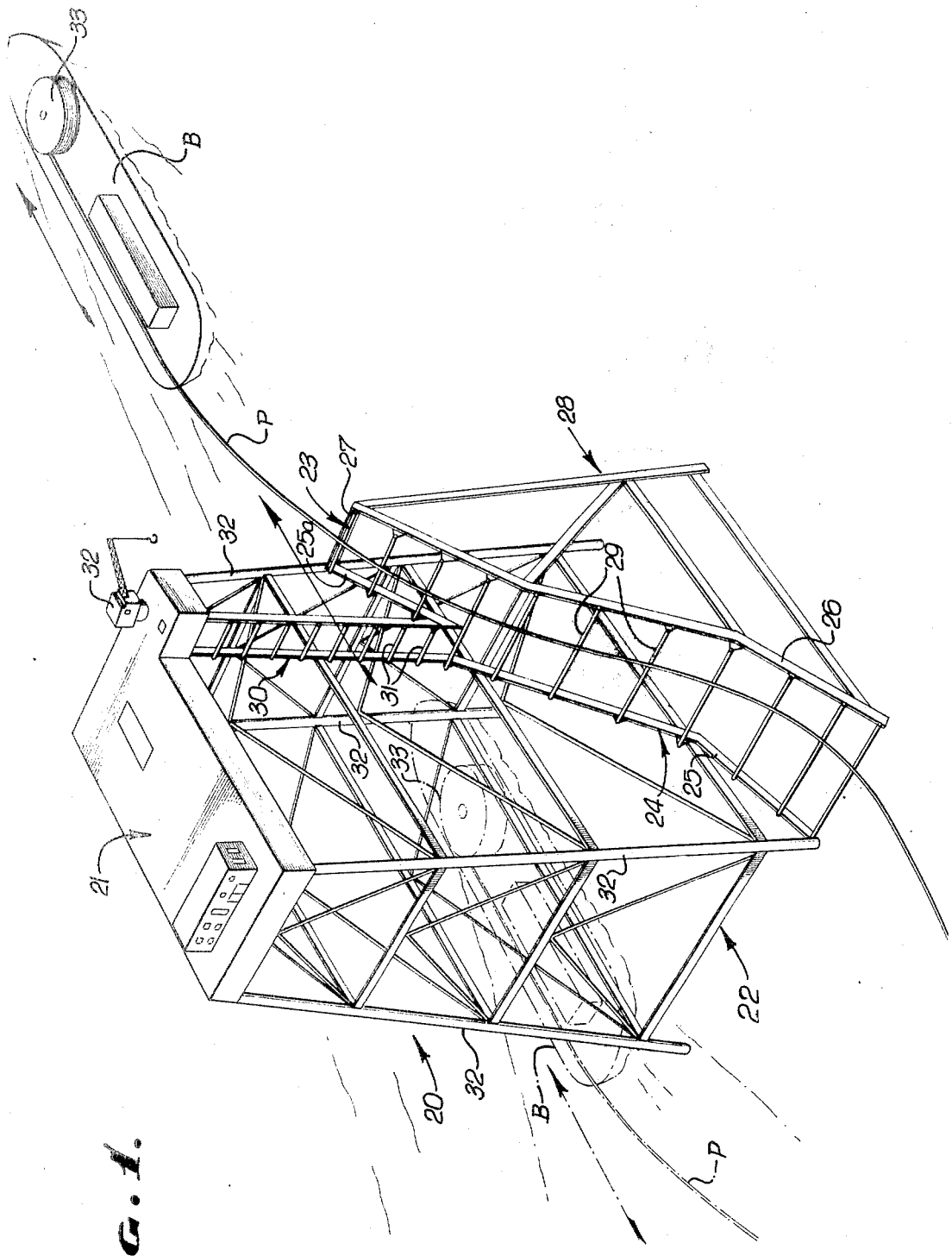
FIG. 1 is a perspective view of an exemplary apparatus for terminating a subsea pipeline at a surface station and of a surface vessel for laying the pipeline along the sea bottom.

Referring now to the drawings, an exemplary embodiment of an apparatus for terminating a subsea pipeline at an oil collection and distribution sea surface station is indicated generally at 20. The apparatus 20 generally comprises platform means indicated generally at 21, supporting under structure indicated generally at 22, and ramp means indicated generally at 23.

While the apparatus 20 is illustrated as having a supporting structure 22 for maintaining the platform 21 above the surface of the ocean or sea by the legs 32 resting upon the ocean floor, it will be understood that the platform 21 may be floating, such as a barge. In such instance, the platform 21 may be maintained at a relatively fixed location with respect to the bottom by a plurality of anchors and a suitable mooring system. A suitable downwardly depending structure may then be provided to support ramp means 23.

Figure 2:
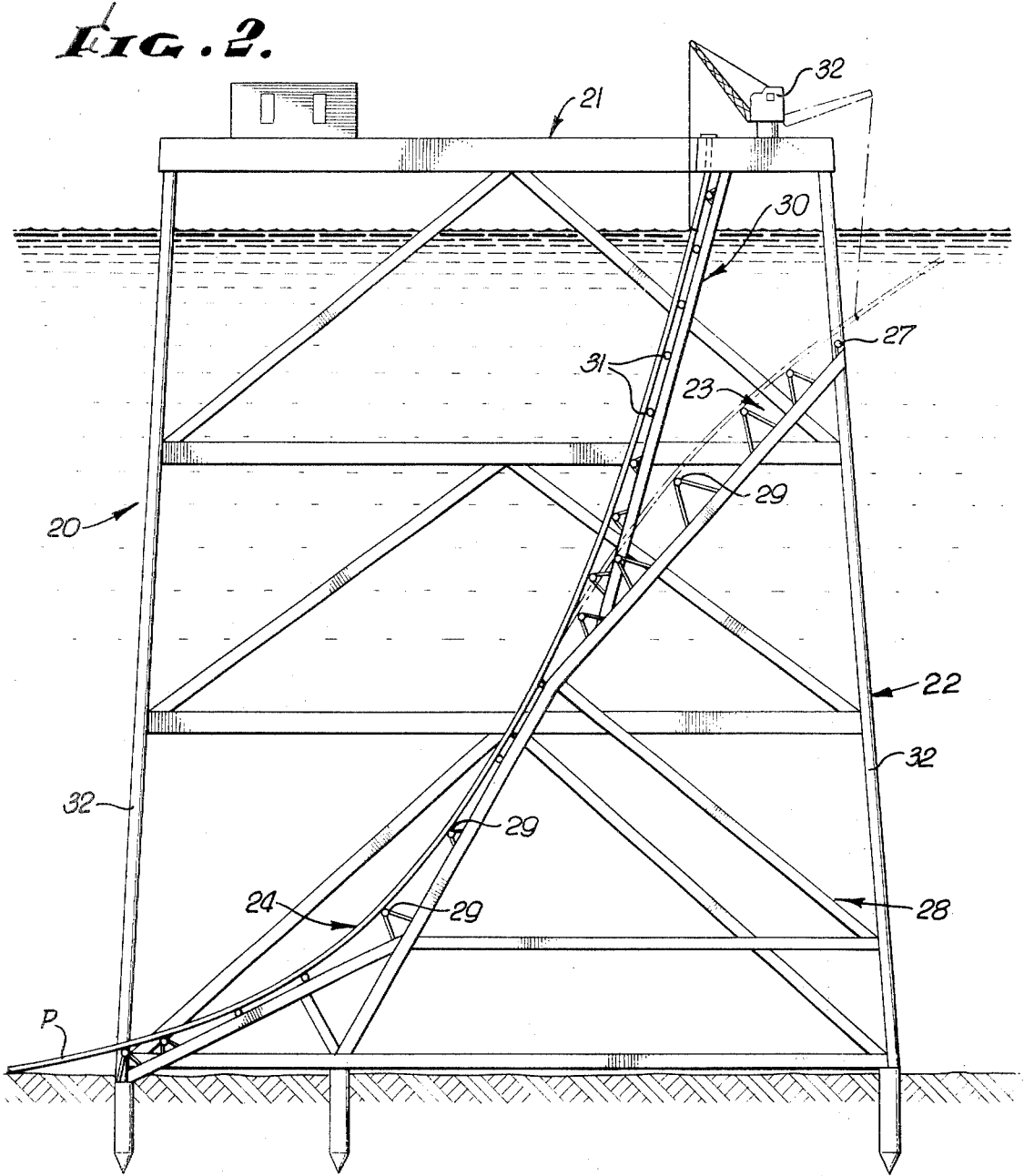
FIG. 2 is a side elevation view of the apparatus illustrated in FIG. 1.
Figure 3:
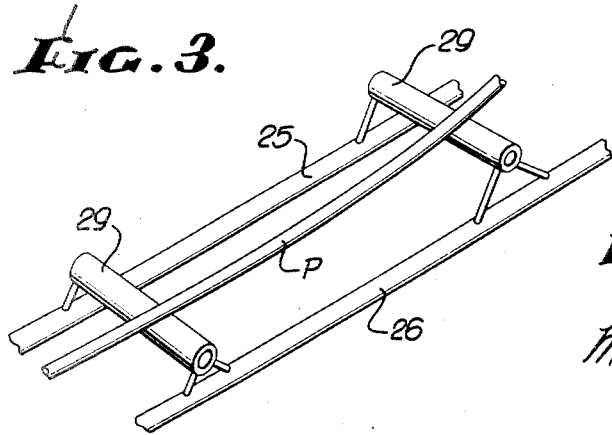
FIG. 3 is a detailed fragmentary perspective view of a portion of the apparatus ramp.

Ramp means 23 in the exemplary embodiment includes a first ramp portion 24 extending from adjacent the ocean bottom to a water depth at least greater than the draft of a pipeline laying vessel. More specifically, first ramp portion 24 comprises a pair of generally parallel side members 25, 25a, 26 and a top member 27 which is positioned below the water surface, as seen best in FIG. 2. For reasons which will be more fully understood hereinafter, the depth below the water surface of top member 27 of the first ramp portion is greater than the maximum draft of any pipeline vessel which would be used in laying a continuous pipeline P along the ocean bottom from a wellhead (not shown). Spaced side members 25, 25a, 26 and top member 27 are supported by a suitable structure indicated at 28.

Longitudinally spaced along side members 25, 25a, 26 are a plurality of transverse pipe support members 29. As seen best in FIG. 2, the pipe support members 29 on first ramp portion 24 defines an ogee curve on which the continuous pipeline will be supported. The ogee curve has radii of curvature which are fairly generous and in relation to the continuous pipeline such radii will provide a curved support path that prevents deflection of the pipeline to a point exceeding its flexural or bending strength. The ogee curve is tangent to the ocean bottom so that the pipe which lays along the bottom will rise gradually along the ramp to an intermediate ramp portion wherein the curve is reversed and a projection of the upper portion may be tangent to the surface of the sea.

The ramp means also comprises a second ramp portion indicated generally at 30, positioned between the upper portion of the first ramp portion and the structure 22. Second ramp portion 30 extends upwardly from a point intermediate the length of the first ramp portion 24 to above the sea surface at the platform means 21. The second ramp portion 30 is generally flat and is inclined in the general direction of inclination of the lower and intermediate portions of the ramp means. Second ramp portion is provided with a plurality of horizontally disposed cross members 31 for supporting the continuous pipeline P. As seen best in FIG. 2, the pipe support members 29 of the first ramp portion and the horizontal pipe support members 31 of the second ramp portion provide a transition support area between the first and second ramp portion. Moreover, the locus of support points on the first and second ramp portions define a smooth, continuous curve.

Platform means 21 is supported above the water surface and includes the various machinery, facilities, living quarters, and other equipment necessary for performing the oil collection and distribution functions of the surface station. In particular, platform means 21 includes means thereon for transferring a pipeline from the first to the second ramp portion. In the exemplary embodiment, such means comprises a pivotally mounted crane 32 positioned adjacent the ramp means and preferably positioned on a portion of the platform projecting outwardly over the second ramp portion. At the point where the second ramp portion connects to the platform, there may be provided a plurality of above-surface pipe connector means such as separate or manifold pipe means for securing in fluid communication the free end of the pipeline P to an oil collection and distribution system.

The method of terminating the subsea pipeline at the apparatus 20 commences with the laying of the continuous pipeline P from a surface vessel or barge B on which is mounted a large reel 33 on which the pipe is wound. One end of pipe P may be secured at or adjacent a wellhead. As the pipe is laid toward the station, pipe joints may be welded on the barge in the event they are not already prewelded when the pipe is placed on the reel. If more than one reel is used, pipe on adjacent reels may be welded or connected on the barge. As the vessel moves forward, the pipeline is fed from the aft end of the vessel where it sinks and settles upon the ocean bottom. As the vessel approaches the station slack loops may be formed in the pipe laterally of the direct path to the station 21. Since the vessel is moving forward, the shape of the curve assumed by the hanging pipe will be an ogee curve. The vessel is then moved over and beyond the submerged upwardly rising first ramp portion 24 which has the ogee curve surface so that the pipeline P is supported by and conforms to the first ramp portion and to its natural curvature. The pipeline is then cut at vessel B at a point beyond the end of the ramp portion. Prior to cutting the pipeline, the crane 32 is positioned so that the pipeline is secured to the crane cable and hook and is supported thereby. The free rising end of the pipeline portion which is connected to the crane cable is then lifted upwardly and toward the platform 21 until the free end portion of the pipe is supported along the second ramp portion 30.

The pipe end may then be secured at the platform surface to a suitable connector. The entire pipeline supported by the ramp means is moved laterally by suitable winches or other means, so that the pipeline is positioned adjacent the structure of the apparatus and is supported by the lower part of the first ramp portion and by the second ramp portion in a smooth, continuous curve. Other pipelines from other wellheads may then be laid and connected to the apparatus in the manner above described; the ramp means ultimately supporting a bank of pipe lines P.

Thus, a plurality of continuous pipelines from a number of wellheads in a subsurface well field may be terminated at an oil collection and distribution station without making a subsurface terminal pipe connection and without producing undue stresses in the pipeline in the manner and with the apparatus described above.

Oil pumped to the station 21 in pipelines P may be stored in suitable storage tanks provided on the ocean floor, or in tank barges or vessels moored alongside station 21. While station 21 in this example is supported from the ocean floor in locations where water depth is not too great, it may be desirable to provide such a station in deep water by utilizing the floatable platform means and anchor system described in my copending application Ser. No. 735,320 wherein a stable floating structure for deep water installations is described.

It will thus be apparent that the ramp means of this invention provides a method of making a terminal connection of a pipeline above water level and thus effects a considerable saving of time, labor and costs.

Obviously, many modifications and variations of the present invention are possible in light of the above teachings. It is therefore to be understood that within the scope of the appended claims the invention may be practiced otherwise than as specifically described.

I claim:
1. A method of terminating a subsea pipeline at a sea surface station without subjecting said line to undue stress and without making a subsea pipe connecting joint, the steps of:
  laying a continuous pipeline from a surface vessel along the ocean bottom;
  moving said vessel over and beyond a submerged rising ramp portion having an ogee-type curve with radii not exceeding deflection charactistics of the pipeline being laid;
  supporting a rising pipeline portion on said curved ramp portion;
  cutting said pipeline at the vessel and beyond said ramp portion with the free rising end of said pipeline portion connected by a line to said station;
  moving said free pipe end portion to the station to transform and support the upper portion of the ogee curve into a pipe rising portion having the same direction as the lower part of the ogee curve;
  and supporting and securing said last mentioned pipe portion on a ramp portion extending to said station.

2. A method of terminating a continuous subsea pipeline at a sea surface station without subjecting said line to undue stress and without making a subsea pipe connecting joint, the steps of:
  laying a continuous pipeline from a surface vessel along the ocean bottom;
  moving said vessel adjacent to a submerged ramp portion of a sea surface station;
  laying and supporting said pipeline on said submerged ramp as said vessel passes said ramp;
  supporting said pipeline on said ramp portion (while said pipeline is cut to selected length and transferred from said vessel to said station);
  cutting said pipeline beyond said ramp portion;
  transferring said cut portion to said station;
  and securing the cut end portion of the pipeline to the station.

3. An apparatus for terminating a subsea pipeline at an oil collection and distribution station without making subsurface terminal pipe connections, the combination of:
  platform means for said station;
  ramp means at said station comprising
    a first ramp portion extending from adjacent the ocean bottom to a water depth such that a pipe laying vessel may pass thereover;
    and a second ramp portion between said first ramp portion and the station platform means and extending upwardly from a point intermediate the length of the first ramp portion to above the sea surface at the platform means;
    said first ramp portion having an ogree curve for supporting the rising portion of the pipeline;
    and means on the platform for transferring a pipeline laid on said first ramp portion to said second ramp portion with a free pipeline end at the platform and available above the sea surface for making a terminal connection.

4. The apparatus of claim 3 wherein said first ramp portion ogee curve has radii of curvature for supporting said pipeline without overstressing thereof.

5. The apparatus of claim 4 wherein said second ramp portion carries means for securing a plurality of generally parallel pipelines to said ramp.

6. An offshore sea surface oil collection and distribution station comprising in combination:
  platform means for said station;
  and upwardly curved divergent ramp means at said station for selectively supporting a rising end portion of a pipeline between the surface of the platform means and the ocean floor without overstressing said pipeline.

7. An offshore station as stated in claim 6 wherein said supporting ramp means includes a ramp portion for supporting and positioning a pipe end portion which extends beyond the said ramp portion.

8. An offshore station as stated in claim 6 wherein the supporting ramp means includes a ramp portion supporting and positioning a pipe end portion which extends above the water level at the platform means for making a pipe connection at the platform means.

9. An offshore station as stated in claim 6 including means for transferring the rising end portion from a pipe laying vessel to the platform means.

10. An offshore station as stated in claim 6 wherein said supporting ramp means includes an upwardly directed ramp portion for supporting and positioning pipe end portions at the platform means in a bank of pipelines.

11. A method of terminating a continuous subsea pipeline at a sea surface station having a submerged ramp, the steps of:
  laying a continuous pipeline from a moving vessel;
  passing said vessel over said submerged ramp;
  laying and supporting said pipeline on said ramp during such passing of said vessel;
  cutting said pipeline;
  transferring the cut end portion of said pipeline to said station; and
  supporting and securing said cut pipe end to said station above water lever.

12. A method as stated in claim 11 including the step of:
  first supporting said pineline on said ramp in a reverse curve before said pipeline is cut.

13. A method as stated in claim 11 including the step of supporting said pipeline in a continuous upwardly rising curve after cutting said pipe.

14. A method as stated in claim 11 including the step of:
  moving said pipe laterally of said ramp when transferring said pipeline from said vessel to said station.

15. An apparatus for terminating a subsea pipeline at a sea surface station without making subsurface terminal pipe connections, the combination of:
  platform means for said station;
  ramp means at said station comprising
    a first ramp portion extending from a location proximate to the ocean bottom to a water depth permitting passage of a pipe laying vessel thereover;
    and a second portion between said first ramp portion and said station platform means and extending upwardly from a location at the aforesaid water depth to above the sea surface at the platform means;
    said first ramp portion having a curve for supporting the rising portion of said pipeline; and
    means on said platform for transferring a pipeline laid on said first ramp portion to said second ramp portion with a free pipeline end available above the sea surface for making a pipe connection above water.

References Cited

UNITED STATES PATENTS

| 3,331,212 | 7/1967 | Cox et al. | 61—72.3 |
| 3,373,570 | 3/1968 | Hindman | 61—72.3 |
| 3,376,708 | 4/1968 | Hindman | 61—72.3 |

JACOB SHAPIRO, Primary Examiner

U.S. Cl. X.R.

61—46.5